(12) United States Patent
Tenghamn et al.

(10) Patent No.: US 11,366,242 B2
(45) Date of Patent: Jun. 21, 2022

(54) LOCK MECHANISM IN A GEL-TYPE STREAMER

(71) Applicant: PGS Geophysical AS, Oslo (NO)

(72) Inventors: Stig Rune Lennart Tenghamn, Houston, TX (US); Nicholas George, Houston, TX (US); Andre Stenzel, Houston, TX (US); Ramon Martinez, Houston, TX (US)

(73) Assignee: PGS Geophysical AS, Oslo (NO)

( * ) Notice: Subject to any disclaimer, the term of this patent is extended or adjusted under 35 U.S.C. 154(b) by 313 days.

(21) Appl. No.: 16/542,260

(22) Filed: Aug. 15, 2019

(65) Prior Publication Data

US 2020/0064504 A1 Feb. 27, 2020

Related U.S. Application Data

(60) Provisional application No. 62/723,025, filed on Aug. 27, 2018.

(51) Int. Cl.
*G01V 1/20* (2006.01)
*G01V 1/38* (2006.01)

(52) U.S. Cl.
CPC ............ *G01V 1/201* (2013.01); *G01V 1/3808* (2013.01); *G01V 1/38* (2013.01)

(58) Field of Classification Search
CPC ......... G01V 1/201; G01V 1/3808; G01V 1/38
(Continued)

(56) References Cited

U.S. PATENT DOCUMENTS 3,885,286 A * 5/1975 Hill .......................... G01V 1/38
29/745
4,736,345 A * 4/1988 Keckler ................. G01V 1/201
367/20
(Continued)

FOREIGN PATENT DOCUMENTS

RU       2 136 019       8/1999
RU       2136019 C1      8/1999
(Continued)

OTHER PUBLICATIONS

International Search Report and Written Opinion for Application No. PCT/EP2019/072836, dated Dec. 4, 2019.
(Continued)

*Primary Examiner* — Ian J Lobo

(57) ABSTRACT

Embodiments may be directed to marine geophysical surveying and associated methods. At least one embodiment may be directed to incorporation of a lock mechanism in a sensor streamer that interlocks the outer jacket with one or more of the spacers to prevent relative rotation between the outer jacket. An embodiment may provide a sensor streamer that includes an outer jacket, a plurality of spacers, and a locking mechanism. The outer jacket may be elongated in an axial direction and comprise an outer jacket surface and an inner jacket surface. The plurality of spacers may be positioned in the outer jacket at spaced apart locations in the axial direction, wherein each of the plurality of spacers comprises a spacer body having an outer spacer surface. The locking mechanism may interlock the outer jacket with at least one of the plurality of spacers.

17 Claims, 6 Drawing Sheets

(58) Field of Classification Search
USPC .................................................. 367/20, 153
See application file for complete search history.

(56) References Cited

U.S. PATENT DOCUMENTS

| | | | |
|---|---|---|---|
| 4,809,243 A | 2/1989 | Bledsoe et al. | |
| 5,404,340 A | 4/1995 | Weichart et al. | |
| 5,943,293 A * | 8/1999 | Luscombe | G01V 1/201 367/20 |
| 7,142,481 B1 | 11/2006 | Metzbower et al. | |
| 7,545,703 B2 * | 6/2009 | Lunde | G01V 1/201 367/20 |
| 7,623,411 B2 * | 11/2009 | Faucheaux | G01V 1/201 367/20 |
| 9,001,617 B2 | 4/2015 | Storteig et al. | |
| 10,132,948 B2 | 11/2018 | Voldsbekk | |
| 2009/0323468 A1 * | 12/2009 | Teigen | G01V 1/201 367/20 |
| 2010/0020644 A1 | 1/2010 | Vignaux | |
| 2010/0039889 A1 * | 2/2010 | Teigen | G01V 1/201 367/20 |
| 2012/0176858 A1 | 7/2012 | Stenzel et al. | |
| 2012/0236684 A1 * | 9/2012 | Juhasz | G01V 3/083 367/20 |

FOREIGN PATENT DOCUMENTS

| | | |
|---|---|---|
| WO | 94/23313 | 10/1994 |
| WO | 19940023313 | 10/1994 |
| WO | 00/26695 | 5/2000 |
| WO | 20000026695 | 5/2000 |

OTHER PUBLICATIONS

International Search Report and Written Opinion for Application No. PCT/EP2019/072836, dated Mar. 11, 2021.

* cited by examiner

LOCK MECHANISM IN A GEL-TYPE STREAMER

CROSS-REFERENCE TO RELATED APPLICATIONS

The present application claims the benefit of U.S. Provisional Application No. 62/723,025, filed Aug. 27, 2018, entitled "Lock Mechanism in a Gel-Type Streamer," the entire disclosure of which is incorporated herein by reference.

BACKGROUND

Techniques for marine surveying include marine geophysical surveying, such as seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more geophysical sensor streamers also may be towed in the water at selected depths by the same or a different vessel. The streamers are typically cables that include a plurality of geophysical sensors disposed thereon at spaced apart locations in the axial direction along the length of the cable. The geophysical sensors may be configured to generate a signal that is related to a parameter being measured by the sensor. At selected times, the energy source may be actuated to generate, for example, seismic or electromagnetic ("EM") energy that travels downwardly into the subsurface rock. Energy that interacts with interfaces, generally at the boundaries between layers of rock formations, may be returned toward the surface and detected by the geophysical sensors on the streamers. The detected energy may be used to infer certain properties of the subsurface rock, such as structure, mineral composition and fluid content, thereby providing information useful in the recovery of hydrocarbons.

In geophysical surveying, the streamer is typically a cable that is stored on a drum on the towing vessel. A typical marine seismic streamer can be up to several kilometers in length and can include hundreds of individual seismic sensors. The streamers are typically made of multiple components, such as strength members, electrical conductors, telemetry cables optical cables, outer jacket, and spacers. The interior space or "void" within the outer jacket may be filled with a suitable filling, material. While the outer jacket may serve to protect the internal components of the streamer during operation, the streamer components may experience stress when towed through the water, for example, due to drag experience as the streamer moves through the water and towing stress from the survey vessel. In some instances, these stresses may cause one or more of the spacers to rotate with respect to the outer jacket. As sensors can be mounted in some of the spacers, this rotation may be problematic, for example, a sensor within a group of sensors rotates more than +/−5° relative to the other sensors within the group. If the rotation is more than 5° per meter, it may be difficult to obtain a good measurement from the sensors fixed in the streamer.

BRIEF DESCRIPTION OF THE DRAWINGS

These drawings illustrate certain aspects of some of the embodiments of the present disclosure and should not be used to limit or define the disclosure.

DETAILED DESCRIPTION

Embodiments may be directed to marine geophysical surveying and associated methods. At least one embodiment may be directed to incorporation of a lock mechanism in a sensor streamer that interlocks the outer jacket with one or more of the spacers to prevent relative rotation between the outer jacket and the spacer. In some embodiments, the lock mechanism may include an inward-facing projection on the outer jacket that engages with a corresponding recess on the one or more spacers. In alternative embodiments, the lock mechanism may include a projection on the one or more spacers that engages with a corresponding recess on the outer jacket.

Figure 1:
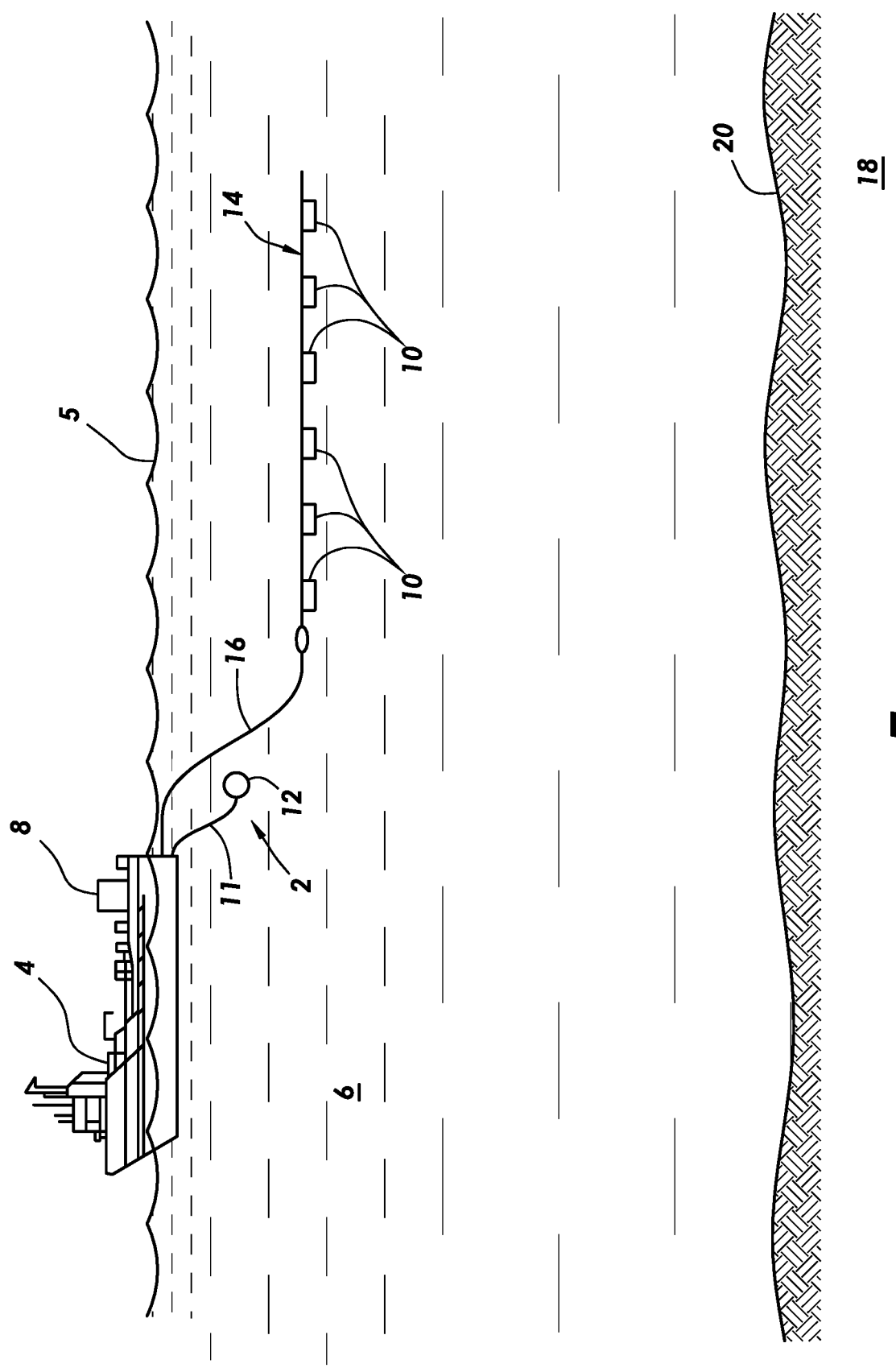
FIG. 1 illustrates an example embodiment of a marine geophysical survey system.

FIG. 1 illustrates a marine geophysical survey system 2 in accordance with example embodiments. Marine geophysical survey system 2 may include a survey vessel 4 that moves along a surface 5 of a body of water 6, such as a lake or ocean. The survey vessel 4 may include thereon equipment, shown generally at 8 and collectively referred to herein as a "recording system." The recording system 8 may include devices (none shown separately) for detecting and making a time indexed record of signals generated by each of geophysical sensors 10 and/or for actuating one or more energy sources 12 at selected times. The recording system 8 may also include devices (none shown separately) for determining the geodetic position of the survey vessel 4 and the various geophysical sensors 10.

The survey vessel 4 or a different vessel (not shown) may tow a source cable 11 that includes the one or more energy sources 12. In other embodiments (not shown), one or more of the energy sources 12 may be mounted to the hull of the survey vessel 4. The energy sources 12 may be any selectively actuable sources suitable for subsurface geophysical surveying, such as electromagnetic sources and seismic sources, including without limitation, electromagnetic field generators, seismic air guns, water guns, marine vibrators or arrays of such devices.

As illustrated, the survey vessel 4 may tow a sensor streamer 14. The sensor streamer 14 may be towed in a selected pattern in the body of water 6 by the survey vessel 4 or a different vessel. In some embodiments, the sensor streamer 14 may be formed, for example, by coupling a plurality of streamer segments (none shown separately). The sensor streamer 14 may be maintained in a selected pattern by towing equipment (not shown), such as paravanes or doors. that provide lateral force to spread the sensor streamer 14 (with respect to other streamers not shown) to selected lateral positions with respect to the survey vessel 4. The sensor streamer 14 may have a length, for example, in a range of from about 2,000 meters to about 12,000 meters or longer. The sensor streamer 14 may include geophysical sensors 10 thereon at spaced apart locations in the axial direction. The type of the geophysical sensors 10 is not a limit on the scope of the present disclosure and may be particle motion-responsive geophysical sensors such as geophones and accelerometers, pressure-responsive geophysical sensors such as hydrophones, pressure time gradient-responsive geophysical sensors, electrodes, magnetometers, temperature sensors or combinations of the foregoing. The configurations of the sensor streamer 14 on FIG. 1 is provided to illustrate an example embodiment and is not intended to limit the present disclosure.

A lead-in line 16 may couple the sensor streamer 14 to the survey vessel 4. In the illustrated embodiment, the lead-in line 16 may include a cable. In some embodiments, the sensor streamer 14 may be towed near the surface 5 of the body of water 6, for example, at a depth of about 25 meters or less, for example. In alternative embodiments, the sensor streamer 14 may be towed at a deeper depth. For example, the sensor streamer 14 may be towed at a depth of up to about 50 meters or more. It should be noted that, while the present example, shows only one sensor streamer 14, the present disclosure is applicable to any number of sensor streamer 14 towed by survey vessel 4 or any other vessel. For example, in some embodiments, two, three, four, or more of the sensor streamer 14 may be towed by survey vessel 4, that can be spaced apart laterally, vertically, or both laterally and vertically.

During operation, certain equipment (not shown separately) in the recording system 8 may actuate the one or more energy source 12 at selected times. In seismic surveying, actuation of the energy sources 12 should cause seismic energy to emit from the energy sources 12 with a seismic signal propagating downwardly through the body of water 6 and into one or more formations 18 below the water bottom 20. A modified seismic signal that is reflected by the formations 18 may be detected by the geophysical sensors 10 as the modified signal travels upwardly through the body of water 6, for example. In electromagnetic surveying, actuation of the energy sources 12 should generate electric and/or magnetic fields in the water 6 that interact with the formations 18. The electric and/or magnetic fields can be detected by the geophysical sensors 10. The geophysical sensor 10 may generate response signals, such as electrical or optical signals, in response to the detected electric and/or magnetic fields (electromagnetic surveying) or modified seismic signal (seismic surveying). The detected signal and/or fields may be used to infer certain properties of the formations 18, such as structure, mineral composition and fluid content, thereby providing information useful in the recovery of hydrocarbons, for example.

In accordance with example embodiments, a geophysical data product indicative of certain properties of the one or more formations 18 may be produced from the detected signal and/or fields. The geophysical data product may include acquired and/or processed geophysical data (e.g., seismic data, geophysical data) and may be stored on a non-transitory, tangible, computer-readable medium. The computer-readable medium may include any computer-readable medium that is tangible and non-transitory, including, but not limited to, volatile memory, such as random access memory (RAM) and non-volatile memory, such as read-only memory (ROM), flash memory, hard disc drives, optical disks, floppy discs, and magnetic tapes. The geophysical data product may be produced offshore (e.g., by equipment on a vessel) or onshore (e.g., at a facility on land) either within the United States and/or in another country. Specifically, embodiments may include producing a geophysical data product from at least the measured acoustic energy (or fields) and storing the geophysical data product on a tangible, non-volatile computer-readable medium suitable for importing onshore. If the geophysical data product is produced offshore and/or in another country, it may be imported onshore to a facility in, for example, the United States or another country. Once onshore in, for example, the United States (or another country), further processing and/or geophysical analysis may be performed on the geophysical data product.

Figure 2:
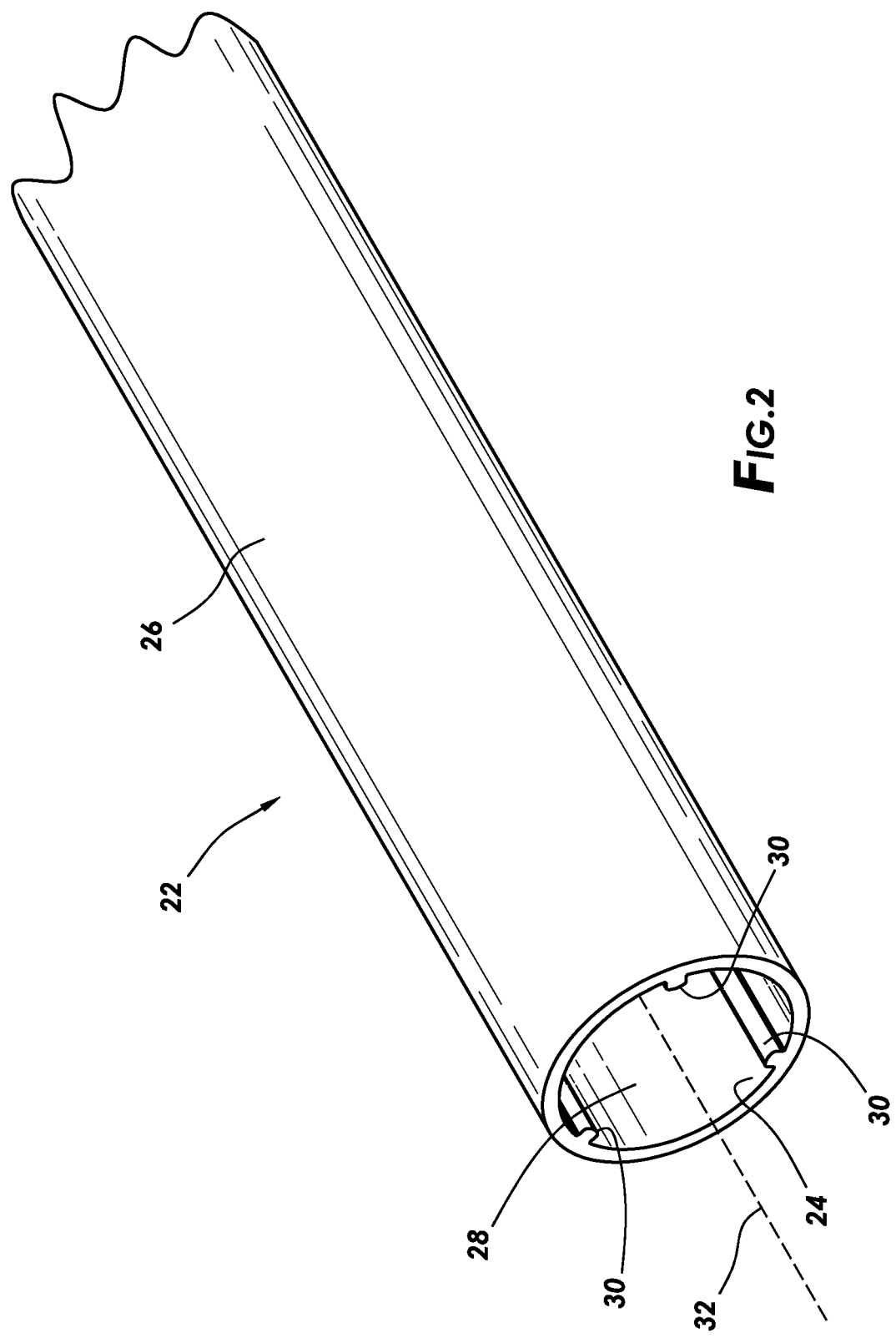
FIG. 2 illustrates a perspective view of an exterior jacket of a seismic streamer in accordance with some embodiments.

FIG. 2 illustrates an example of an outer jacket 22. The outer jacket 22 may be used with any suitable sensor streamer for geophysical surveying, such as sensor streamer 14 shown on FIG. 1. The outer jacket 22 may be elongated in an axial direction in that it may be longer than it is wide. The outer jacket 22 may have an inner jacket surface 24 and an outer jacket surface 26. The outer jacket 22 may also form an internal cavity 28 in which internal components of the sensor streamer 14 may be disposed. The outer jacket 22 may formed of any suitable material, for example, that may serve to protect internal components from water intrusion. In some embodiments, the outer jacket 22 should be acoustically transparent. Suitable materials for the outer jacket 22 may include, but are not limited to, thermoplastics, such as polyurethane, polypropylene, or polyamides. The outer jacket 22 may have any suitable dimensions. For example, the outer jacket 22 may have an outer diameter of about 40 millimeters to about 200 millimeters, about 50 millimeters to about 100 millimeters, or about 50 millimeters to about 75 millimeters. By way of further example, the outer jacket 22 may have a thickness of about 1 millimeter to about 10 millimeters, about 2 millimeters to about 5 millimeters, or about 3 millimeters to about 4 millimeters. It should be understood that these ranges for the outer diameter and thickness for the outer jacket 22 are merely exemplary and that embodiments may include an outer jacket 22 with an outer diameter and/or thickness outside these ranges as desired for a particular application.

In at least one embodiment, the outer jacket 22 may include one or more projections 30. As illustrated, the one or more projections 30 may extend inward from the inner jacket surface 24. In the illustrated embodiment, the one or more projections 30 also extend lengthwise along the longitudinal axis 32 of the outer jacket 22. The one or more projections 30 may be spaced regularly or irregularly around the inner jacket surface 24. The illustrated embodiment includes four of the projections 30 spaced regularly around the inner jacket surface 24. However, it should be understood the present disclosure is not limited to four of the projections 30 and is applicable to any number of projections 30 on the inner jacket surface 24. For example, in some embodiments, one, two, three, four, five, six, or more of the projections 30 may be spaced around the inner jacket surface 24.

Figure 3:
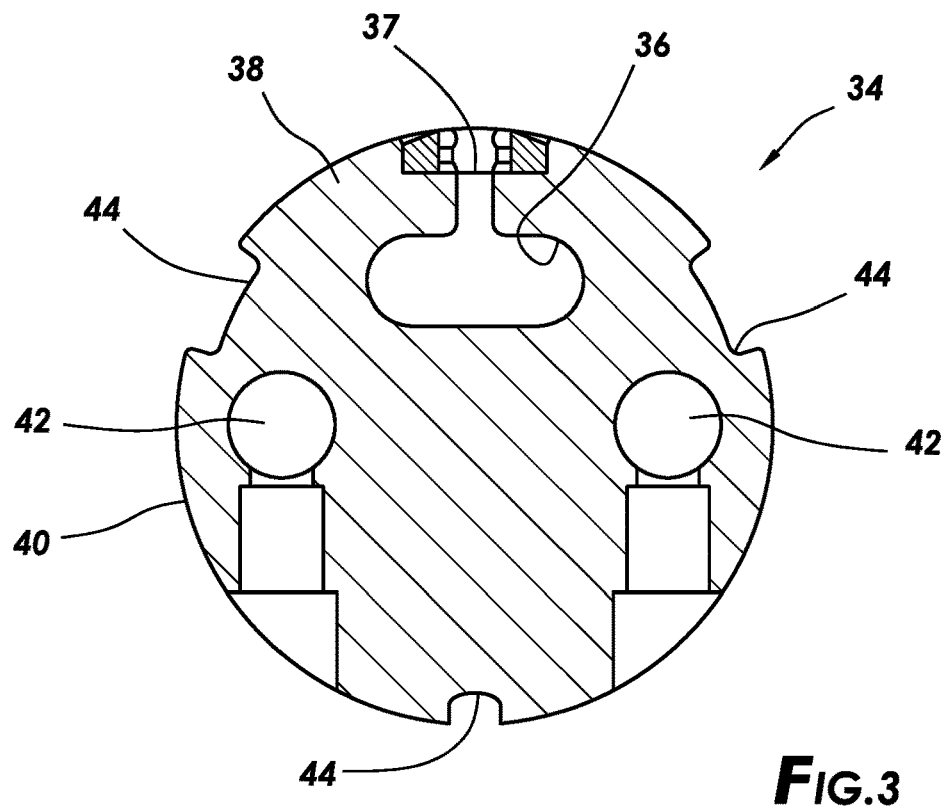
FIG. 3 illustrates a cross-sectional view of the exterior jacket of FIG. 2 taken along horizontal plane 3 in accordance with some embodiments.

FIG. 3 illustrates an example of a spacer 34. The spacer 34 may be used with any suitable sensor streamer for geophysical surveying, such as sensor streamer 14 shown on FIG. 1. In some embodiments, more than one of the spacers 34 are disposed in the sensor streamer 14. In general, a plurality of the spacers 34 may be arranged in the outer jacket 22 (e.g., shown on FIG. 2) at spaced apart locations in the axial direction. The spacer 34 may typically be one of two types of spacers, including, but not limited to, a buoyancy spacer or a sensor spacer. In some embodiments, the number and density of the buoyancy spacers may be selected to provide the sensor streamer 14 with approximately the same overall density as seawater so that the sensor streamer 14 will be substantially neutrally buoyant. In some embodiments, the number and density of the buoyancy spacers may be selected to provide the sensor streamer 14 with a density slightly less than freshwater with final adjustments made with addition of ballast. Suitable buoyancy spacers may be made from a foam material, such as foamed polypropylene. Alternative buoyancy spacers may also include microsphere-containing polymers (e.g., polypropylene or polyethylene). The sensor spacers may typically be arranged in the outer jacket 22, for example, to provide structural support to the outer jacket 22 and provide a mount platform for geophysical sensors (e.g., geophysical sensors 10 shown on FIG. 1). For example, spacer 34 may be a sensor spacer and define a sensor housing 36 with a geophysical sensor 10 (e.g., shown on FIG. 1) mounted therein. A channel 37 may interconnect the sensor housing 36 with an exterior of the spacer 34. Suitable sensor spacers may also be made from any of a variety of suitable materials, such as polyurethane, a foam material, such as foamed polyurethane, aliphatic polyamides, semi-aromatic polyamides, polyoxymethylene, polyether ether ketone, or aluminum, among others.

In the illustrated embodiment, the spacer 34 may include a spacer body 38 having an outer spacer surface 40. As illustrated, the spacer body 38 may define one or more through passageways 42. The one or more through passageways 42 may be centrally located (not shown), but embodiments also contemplate multiple through passageways 42 otherwise arranged in the spacer body 38 as shown on FIG. 3. The through passageway 42 may provide a passage for other streamer internal components to pass through the spacer 34, such as strength members, telemetry cables (e.g., optical cables), and/or electrical conductors. The spacer body 38 may have any suitable configuration. In some embodiments, the spacer body 38 may be generally disc-shaped.

In at least one embodiment, the spacer body 38 may include one or more recesses 44 formed in the outer spacer surface 40. The one or more recesses 44 formed on the spacer body 38 may generally correspond with the one or more projections 30 of the outer jacket 22 (e.g., shown on FIG. 2). The one or more recesses 44 may be spaced regularly or irregularly around the outer spacer surface 40. The illustrated embodiment includes three of the recesses 44 spaced regularly around the outer spacer surface 40. However, it should be understood the present disclosure is not limited to three of the recesses 44 and is applicable to any number of recesses 44 on the outer spacer surface 40. For example, in some embodiments, one, two, three, four, five, six, or more of the recesses 44 may be spaced around the outer spacer surface 40.

Figure 4:
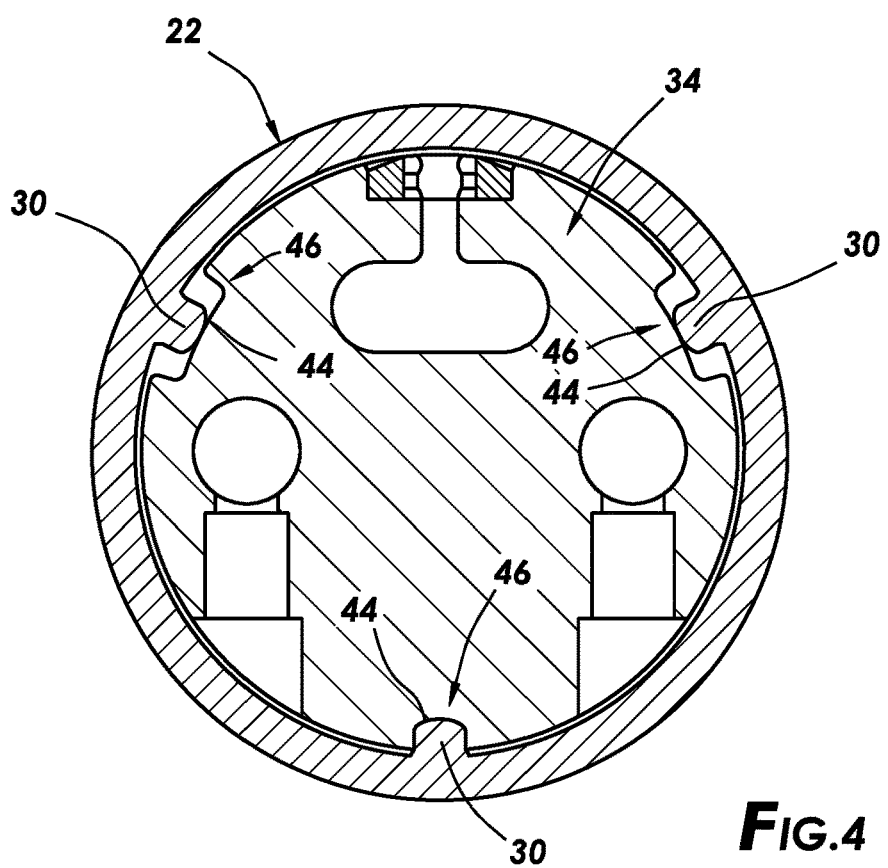
FIG. 4 illustrates a cross-sectional view of a spacer of a seismic streamer in accordance with some embodiments.

FIG. 4 illustrates the outer jacket 22 of FIG. 2 disposed on the spacer 34 of FIG. 3 in accordance with some embodiments. As illustrated, one or more lock mechanisms 46 may be provided that interlock the outer jacket 22 and the spacer 34. By interlocking, the spacer 34 with the outer jacket 22, embodiments may prevent (or at least reduce) rotation of the outer jacket 22 relative to the spacer 34. In the illustrated embodiment, the locking mechanisms 46 include the projections 30 of the outer jacket 22 and the recesses 44 of the spacer body 38. In some embodiments, each of the projections 30 engage with a corresponding one of the recesses 44 to interlock the outer jacket 22 and the spacer 34, preventing relative rotation. In at least one embodiment, the recesses 44 may have different sizes, as shown on FIG. 4, for example, so that there may be clearance between one or more of the projections 30 an the larger of the recesses 44. In some embodiments, the locking mechanisms 46 may be considered a radial locking mechanism as the locking components (e.g., projects 30, recesses 44) extend either radially inward and/or radially outward from the longitudinal axis of the outer jacket 22.

Figure 6:
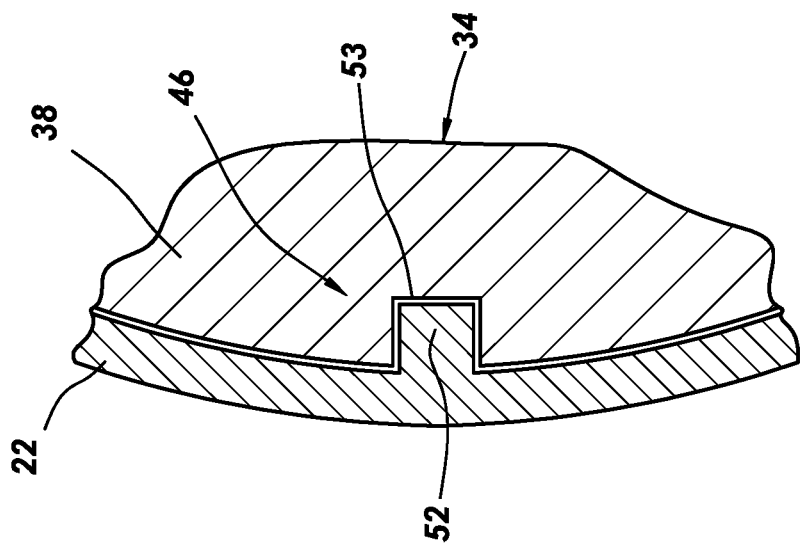
FIG. 6-9 illustrate additional embodiments of a locking mechanism for securing an exterior jacket to one or more spacers in accordance with some embodiments.
Figure 5:
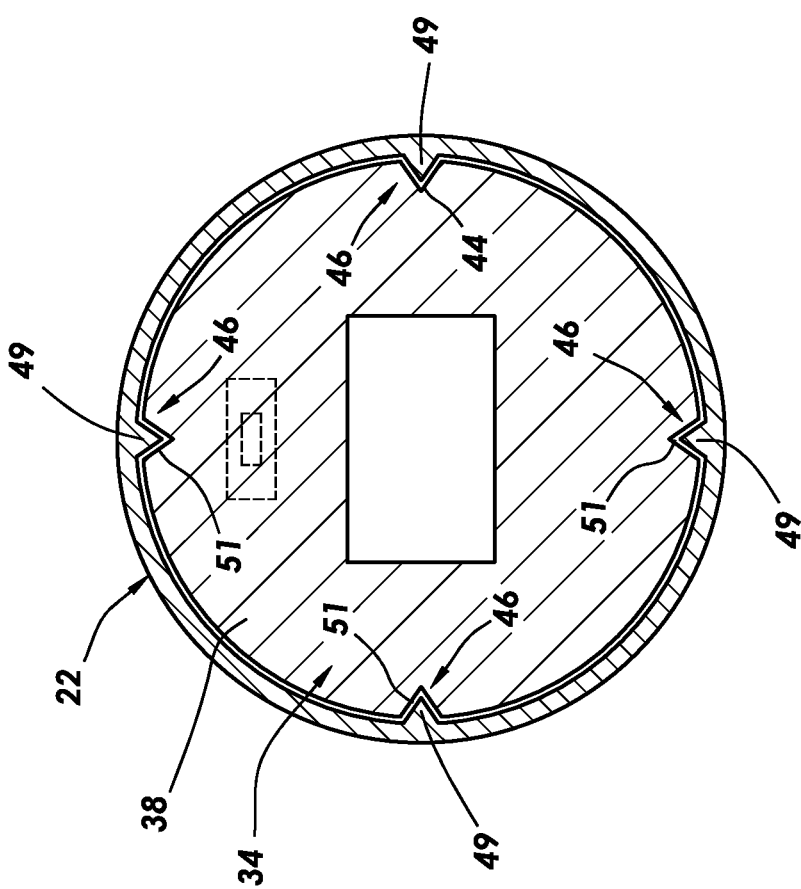
FIG. 5 illustrates a cross-sectional view of an alternative embodiment of a spacer for use in a seismic streamer.
Figure 7:
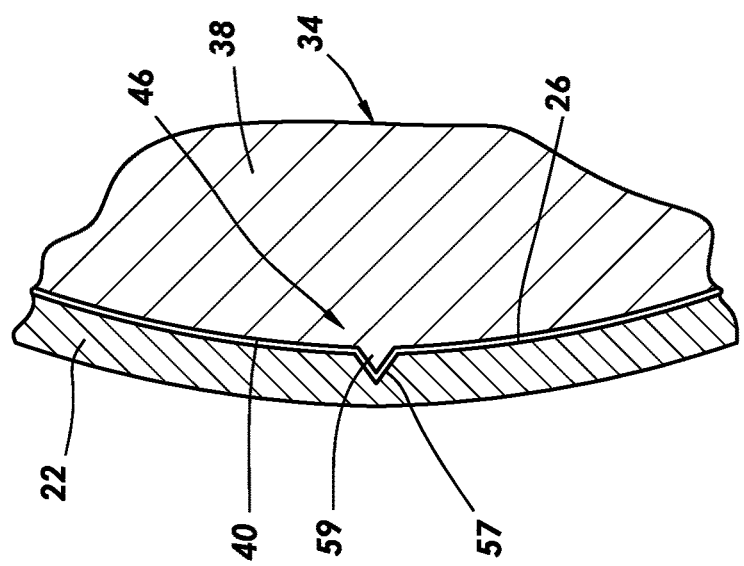
Figure 8:
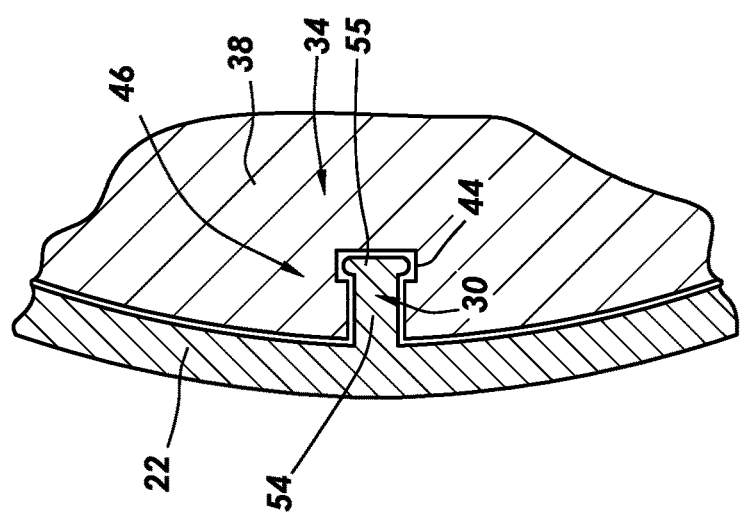

It should be understood that the lock mechanisms 46 may have a number of different configurations. As illustrated on FIG. 4, the lock mechanism 46 may include projections 30 from the outer jacket 22 that may be arcuate in shape. However, other embodiments encompass lock mechanisms 46 with alternative configurations. FIG. 5 illustrates an alternative embodiment of lock mechanisms 46 that include angular projections 49 from the outer jacket 22 with corresponding angular recesses 51 in the spacer body 38 for receiving the angular projection 48. In the illustrated embodiment, four of the lock mechanisms 46 are shown. For example, four of the angular recesses 51 are formed in the spacer body that receive four of the angular projections 49 from the outer jacket 22. FIG. 6 illustrates an embodiment of a lock mechanism 46 that includes a rectangular projection 52 from the outer jacket 22 with a corresponding rectangular recess 53 in the spacer body 38 for receiving the rectangular projection 52. FIGS. 7 and 8 illustrate alternative embodiments of the lock mechanism 46 that includes a projection 30 from the outer jacket 22 that includes neck 54 and an enlarged head 55 that are received in a corresponding recess 44 in the spacer body 38. In some embodiments, as shown on FIG. 7, the enlarged head 55 may be angular in shape. For example, In other embodiments, as shown on FIG. 8, the enlarged head 55 may have rounded ends.

Figure 9:
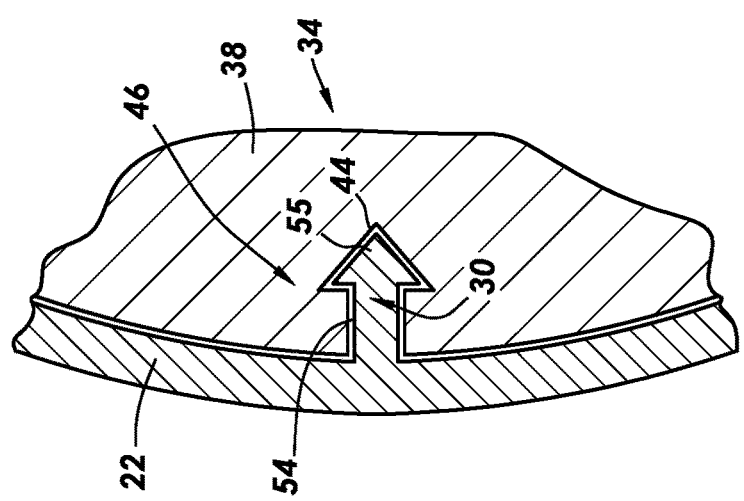

While the preceding FIGS. 4-8 illustrate embodiments of the lock mechanism 46 with different projections (e.g., projections 30 on FIGS. 4, 7, and 8, angular projection on FIG. 5, and rectangular projections on FIG. 6) from the outer jacket 22, it should be understood that the present disclosure is intended to also encompass embodiments with spacer projections 59, as shown on FIG. 9. For example, embodiments may include spacer projections 59 from the outer spacer surface 40. As illustrated, the spacer projections 59 may engage a corresponding jacket recess 57 formed in an outer jacket surface 26 of outer jacket 22 to interlock the spacer 34. In the illustrated embodiment, the spacer projections 59 engage with the jacket recess 57 to interlock the outer jacket 22 and the spacer 34, preventing relative rotation. In another embodiment, lock mechanism 46 can include a recess in each of outer jacket 22 (e.g. jacket recess 57 shown in FIG. 9) and spacer 38 (e.g. recess 44 shown in FIG. 3). The recesses can be aligned and a spline (not shown) can be inserted to engage both recesses to interlock outer jacket 22 and spacer 34.

Figure 10:
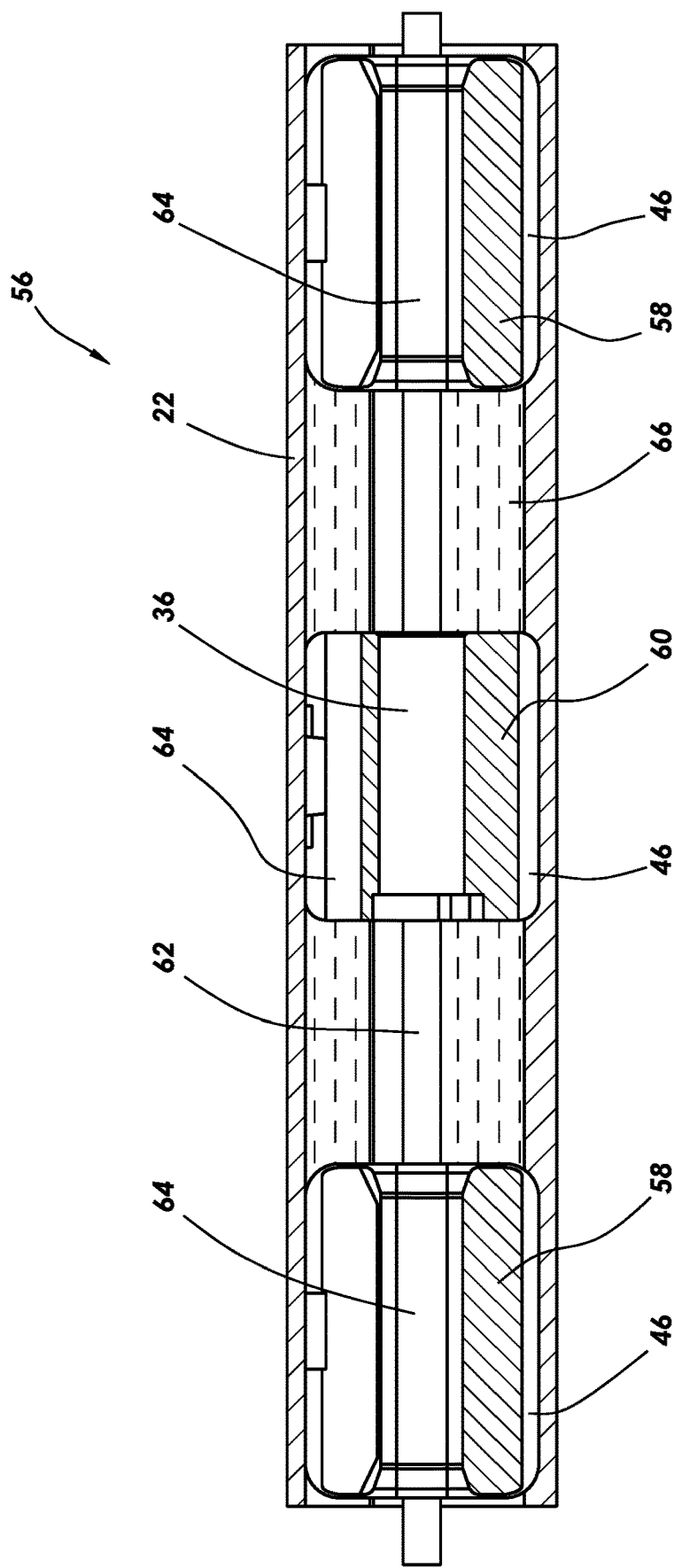
FIG. 10 illustrates a cut-away view of an example embodiment of a streamer segment.

FIG. 10 is a cut away view of an example of a streamer segment 56. As previously described, sensor streamers, such as sensor streamer 14 on FIG. 1, may be manufactured from more than one streamer segment 56 attached end to end. Streamer segment 56 may have a length of about 25 meters to about 150 meters or about 50 meters to about 100 meters. In some embodiments, streamer segment 56 may have a length of about 75 meters. However, the particular length of streamer segment 56 is not intended to be limited by these values and may vary as desired for a particular application.

As illustrated, the streamer segment 56 may include outer jacket 22, buoyancy spacers 58, and one or more sensor spacers 60. The buoyancy spacers 58 and sensor spacers 60 may be positioned in the outer jacket 22 at spaced apart locations in the axial direction along the length of the streamer segment 56. The buoyancy spacers 58 may be configured to have a selected density, as described above. The sensor spacers 60 may include a sensor housing 36 that houses a geophysical sensor 10 (e.g., shown on FIG. 1).

At least one embodiment of the streamer segment 56 may include one or more strength members 62 that extend through streamer segment 56. The strength members 62 may extend the length of the streamer segment 56. Strength members 62 may transmit axial force along the length of the streamer segment 56. Axial force may be transmitted through the strength members 62 in one streamer segment 56 to the strength members 62 in an adjoining streamer segment (not shown). Suitable materials for strength members 62 may include, but are not limited to, fiber robe, synthetic rope, or metallic ropes, among others.

At least one embodiment of the buoyancy spacers 58 may include a wire cavity 64 that extends through the buoyancy spacers 58. The sensor spacers 60 may also include a wire cavity 64. While not shown, electrical conductors and telemetry cables (e.g., optical fibers) that may extend through each streamer segment 56 may extend through the wire cavities 64 in the buoyancy spacers 58 and sensor spacers 60. Electrical conductors can conduct electric signals and/or electrical power through the streamer segment 56, for example, between streamer components and recording system 8 (e.g., shown on FIG. 1). The telemetry cables may conduct data (e.g., optical signals) through the streamer segment 56, for example, between streamer components and recording system 8 (e.g., shown on FIG. 1).

At least one embodiment of the streamer segment 56 may include a void-filling material 66. The void-filling material 66 should occupy spaces inside the outer jacket 22 that are not occupied by the various other components, such as buoyancy spacers 58, sensor spacers 60, strength members 62, and wiring. Suitable examples of the void-filling material 66 may include, but are not limited to, hot-melt adhesives, thixotropic-filling compounds and thermoplastics. An example of a suitable void-filling material 66 may include a hydrocarbon-based oil or oil-blend that has been gelled using a gelation agent such as an elastomer polyurethane compound or other cross-linked elastomer, wherein the gelation is thermally reversible. In some embodiments, the gelation agent can be a type of polymer that undergoes cross-linking when it is exposed to radiation, such as ultraviolet light or electron beam radiation. Generally, the void-filling material 66 will undergo a state change after filling all the void space in the mechanical harness. Such state change may be affected by application of heat to break the gel, when thermally reversible gels are used, followed by cooling to reform the gel. State change may also be affected by exposing radiation curable gel in its liquid form to a source of radiation.

As previously described, the components of the streamer segment 56 may experience stresses. For example, outer jacket 22 may experience draft from towing. Buoyancy spacers 58 and one or more sensor spacers 60 may experience stresses from the strength members 62 running therethrough. As a result of these stresses, the outer jacket 22 and spacers (e.g., buoyancy spacers 58 and one or more sensor spacers 60) may rotate with respect to one another. In at least one embodiment, the lock mechanisms 46 (e.g., shown in more detail on FIGS. 4-10) may be incorporated into the streamer segment 56, for example, to interlock the outer jacket 22 with at least one of the sensor spacers 60. The lock mechanisms 46 may also be used to interlock the outer jacket 22 with at least one of the buoyancy spacers 58. By interlocking, relative rotation may be prevented, for example, thus maintaining position of the geophysical sensors 10 in the streamer segment 56 with respect to one another.

The particular embodiments disclosed above are illustrative only, as the described embodiments may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this disclosure.

What is claimed is:

1. A sensor streamer, comprising:
an outer jacket that is elongated in an axial direction and comprises an outer jacket surface and an inner jacket surface;
a plurality of spacers positioned in the outer jacket at spaced apart locations in the axial direction, wherein each of the plurality of spacers comprises a spacer body having an outer spacer surface; and
a locking mechanism that interlocks the outer jacket with at least one of the plurality of spacers, wherein the locking mechanism comprises a projection from the inner jacket surface that is received in a corresponding recess formed in the outer spacer surface of the spacer body in at least one of the plurality of spacers.

2. The sensor streamer of claim 1, wherein the projection comprises a neck and an enlarged head.

3. The sensor streamer of claim 1, wherein the projection is an angular projection, a rectangular projection, or an arcuate projection.

4. The sensor streamer of claim 1, wherein the locking mechanism comprises a plurality of projections spaced apart around the inner jacket surface that are received in corresponding recesses formed in the outer spacer surface of the spacer body in at least one of the plurality of spacers.

5. The sensor streamer of claim 4, wherein the plurality of projections are spaced apart regularly around the inner jacket surface.

6. The sensor streamer of claim 4, wherein the at least one of the plurality of spacers is a sensor spacer that comprises a geophysical sensor and a sensor housing in the spacer body that houses the sensor.

7. The sensor streamer of claim 1, wherein the sensor streamer comprises a streamer segment comprising:
the outer jacket;
the plurality of spacers positioned in the outer jacket at spaced apart locations;

the locking mechanism that interlocks the outer jacket with at least one of the plurality of spacers;

strength members positioned in the outer jacket and that extends the length of the streamer segment; and a geophysical sensor positioned in a sensor housing formed in the spacer body of at least one of the plurality of spacers.

8. The sensor streamer of claim 7, wherein the locking mechanism comprises a projection from an inner jacket surface that is received in a corresponding recess formed in the outer spacer surface of the spacer body of at least one of the plurality of spacers.

9. The sensor streamer of claim 1, wherein the locking mechanism comprises a plurality of projections spaced regularly around the inner jacket surface that are received in corresponding recesses formed in the outer spacer surface of the spacer body of at least one of the plurality of spacers.

10. A sensor streamer, comprising, an outer jacket that is elongated in an axial direction and comprises an outer jacket surface and an inner jacket surface a plurality of spacers positioned in the outer jacket at spaced apart locations in the axial direction, wherein each of the plurality of spacers comprises a spacer body having an outer spacer surface; and a locking mechanism that interlocks the outer jacket with at least one of the plurality of spacers, wherein the locking mechanism comprises a recess in the inner jacket surface and the spacer body of one or more of the spacers, and wherein the locking mechanism further comprises a spline inserted in the recess between the inner jacket surface and the spacer body.

11. A sensor streamer, comprising, an outer jacket that is elongated in an axial direction and comprises an outer jacket surface and an inner jacket surface a plurality of spacers positioned in the outer jacket at spaced apart locations in the axial direction, wherein each of the plurality of spacers comprises a spacer body having an outer spacer surface; and a locking mechanism that interlocks the outer jacket with at least one of the plurality of spacers, wherein the locking mechanism comprises a projection from the outer spacer surface of the spacer body of at least one of the plurality of spacers that is received in a corresponding recess formed in the inner jacket surface.

12. A marine geophysical survey system, comprising:

an energy source for emitting energy into a body of water; and a sensor streamer towable behind a survey vessel for generating signals in response to energy emitted from the energy source, wherein the sensor streamer comprises:

an outer jacket that is elongated in an axial direction and comprises an outer jacket surface and an inner jacket surface;

a plurality of spacers positioned in the outer jacket at spaced apart locations in the axial direction, wherein each of the plurality of spacers comprises a spacer body having an outer spacer surface;

a geophysical sensor for measuring the energy from the energy source, wherein the geophysical sensor is positioned in the spacer body of at least one of the spacers; and a locking mechanism that interlocks the outer jacket with at least one of the plurality of spacers, wherein the locking mechanism comprises a projection from the inner jacket surface that is received in a corresponding recess formed in the outer spacer surface of the spacer body in at least one of the plurality of spacers.

13. The marine geophysical survey system of claim 12, wherein the projection comprises a neck and an enlarged head.

14. The marine geophysical survey system of claim 12, wherein the sensor streamer comprises a streamer segment comprising:

the outer jacket;

the plurality of spacers positioned in the outer jacket at spaced apart locations;

the locking mechanism that interlocks the outer jacket with at least one of the plurality of spacers; and strength members positioned in the outer jacket and that extends the length of the streamer segment.

15. The method of claim 12, further comprising the survey vessel, wherein the energy source and the geophysical sensor are connected to the survey vessel.

16. A method for geophysical surveying comprising:

towing a sensor streamer in a body of water, wherein the sensor streamer comprises an outer jacket, a plurality of spacers positioned in the outer jacket at spaced apart locations, and a plurality for geophysical sensors spaced on the sensor streamer in the outer jacket, wherein the outer jacket and at least one of the plurality of spacers are interlocked to prevent relative rotation therebetween during the towing, and wherein at least one projection from an inner jacket surface of the outer jacket engages at least one corresponding recess in an outer spacer surface of the at least one of the spacers;

emitting energy into the body of water with at least one energy source; and detecting the energy with one or more of the plurality of geophysical sensors.

17. The method of claim 16, further comprising: obtaining geophysical data from the energy; and processing the geophysical data to produce a geophysical data product.

* * * * *